July 22, 1958 L. BRENDEL 2,844,050
SIMPLIFIED FREE WHEELING BICYCLE HUB
Filed Feb. 21, 1957 2 Sheets-Sheet 1

INVENTOR:
LUDWIG BRENDEL
BY
Richardson, David and Norden
ATTORNEYS.

July 22, 1958  L. BRENDEL  2,844,050
SIMPLIFIED FREE WHEELING BICYCLE HUB
Filed Feb. 21, 1957  2 Sheets-Sheet 2

INVENTOR:
LUDWIG BRENDEL
By
Richardson, Davis and Nerdon
ATTYS.

United States Patent Office 2,844,050
Patented July 22, 1958

2,844,050
SIMPLIFIED FREE WHEELING BICYCLE HUB

Ludwig Brendel, Schweinfurt, Germany, assignor to Fichtel & Sachs A. G., Schweinfurt am Main, Bavaria, Germany Application February 21, 1957, Serial No. 641,617

Claims priority, application Germany February 26, 1956

2 Claims. (Cl. 74—750)

The present invention relates to a novel bicycle hub provided with a free wheeling mechanism. More particularly, it relates to a simplified bicycle hub including a friction socket, the hub corresponding generally to that shown in U. S. Patent No. 2,799,183 issued on July 16, 1957 on an application Serial No. 611,310 filed September 21, 1956, by Hans Rhein and Ludwig Brendel.

In accordance with the Rhein et al. disclosure there was provided a transmission hub for a bicycle which hub included a free wheeling mechanism. The forward drive was effected by means of a pawl operated ratchet gear. A single friction socket was provided intermediate the pawls and hub casing, the socket being provided with recesses or apertures through which the pawls could extend for driving engagement. The control socket caused the pawls to rotate in one direction during free wheeling, for example, while the return of the pawls to establish a driving connection was effected by means of separate springs individually associated with each pawl.

While this arrangement is quite satisfactory in operation, it is an object of the invention to provide an equally effective but simplified arrangement.

It is a further object of the invention to simplify the construction of the control socket and pawls and to omit the return springs thereby decreasing the cost of manufacture.

In accordance with the present invention it has been found that by suitable proportioning of the pawls and the recesses in the friction socket through which the pawls extend when in driving engagement, the pawls will be guided and controlled by the friction socket in both directions. Consequently, the springs heretofore provided for displacement of the pawls are unnecessary.

The invention will now be described more fully with reference to the accompanying drawing wherein:

Fig. 4 is a side elevation of the friction socket embodied in the hub of Figs. 1 to 3; and Fig. 5 is a front elevation of the friction socket as seen from the right hand side of Fig. 4 in the direction of the arrow.

Figure 1:
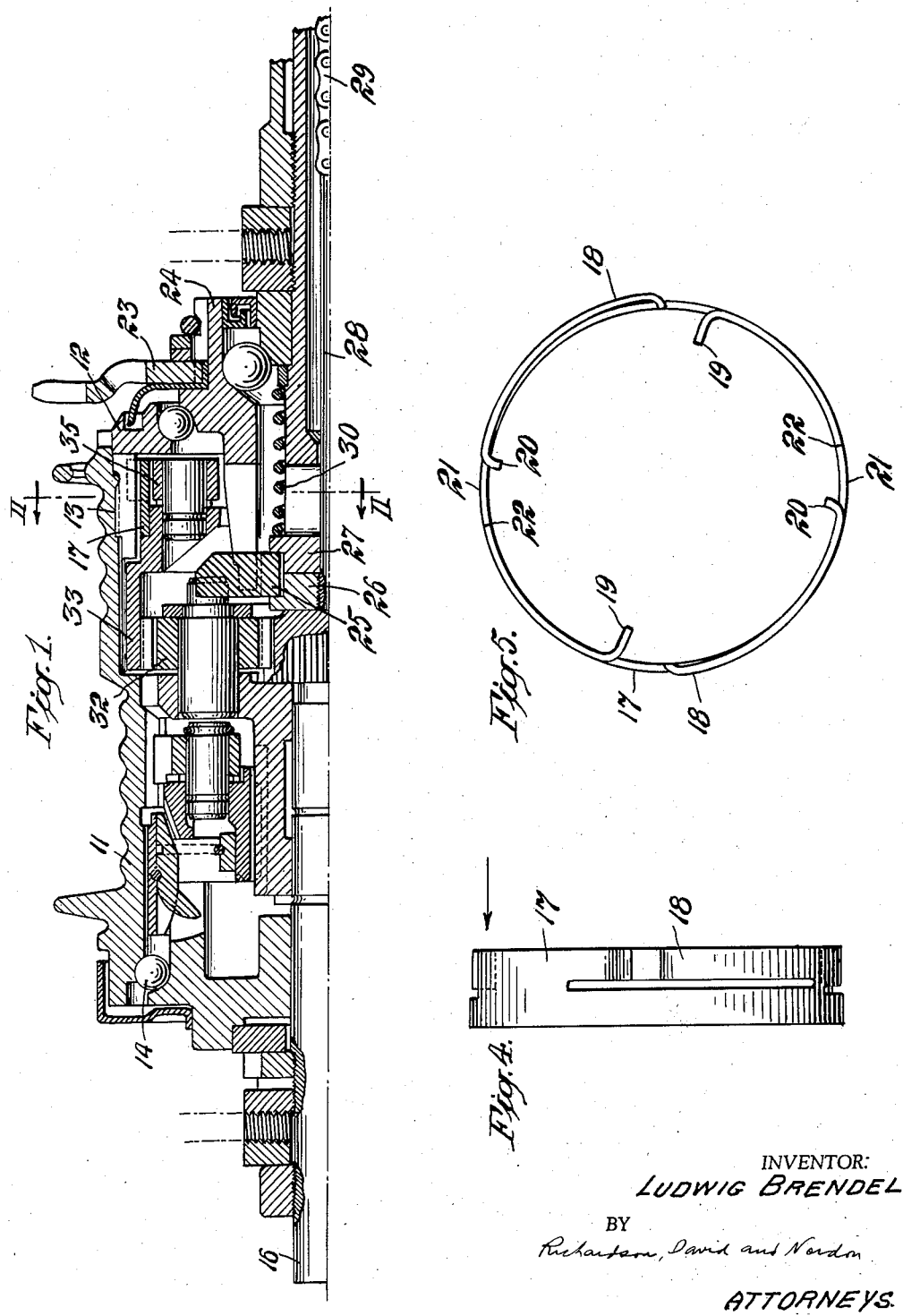
Fig. 1 is an axial section through half of a bicycle hub in accordance with the present invention.

Referring now more particularly to the drawing, in Fig. 1 there is shown a bicycle hub casing 11 to which there is secured at the right hand end an annular member 12 provided with cam-like projections 13. The casing 11 and member 12 are supported by ball bearings 14, 15 for rotation about axle 16. A friction socket 17 slides on the inner surface of member 12 and, as shown in Figs. 4 and 5, includes outwardly arched leaf spring portions 18, alternated inwardly directed projections 19 and 20, and recesses 21 defined between projections 20 and the edges 22 of the next segment of socket 17.

A sprocket wheel 23 is adapted to be driven by the pedals of the bicycle (not shown) and in turn drives an impeller 24 extending into the interior of casing 11. Rotation of impeller 24 in turn produces rotation of engaging member 25 which is seated in a recess defined by blocks 26, 27. These blocks are connected with a gear shift rod 28 which in turn is connected with a chain 29 extending to a gear shift lever (not shown) adjacent the bicycle handlebar. A spring 30 urges blocks 26, 27 to the left so that the engaging member 25 is in the path of carrier 31 of the sun- and planet-gear and thereby causes carrier 31 to be rotated. This produces rotation of planet gear 32 and external sun gear 33 which is connected with pins 34.

Figure 2:
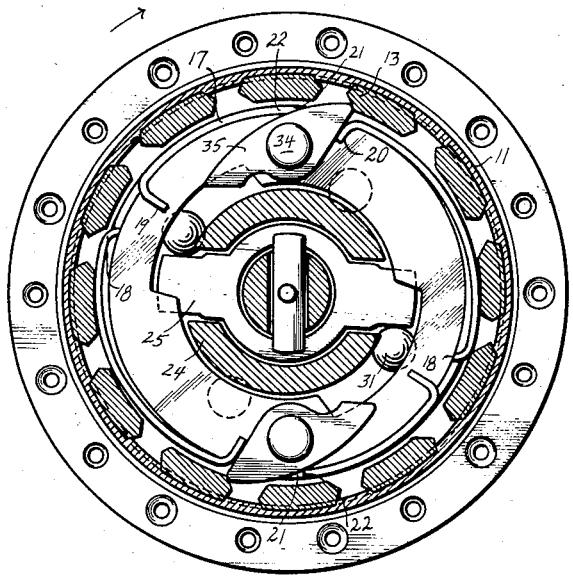
Fig. 2 is a vertical transverse section taken through the hub of Fig. 1 along line II—II with both halves shown.

Pawls 35 are pivotally mounted about pins 34 and upon rotation of the pins the pawls impinge against projections 20 that they pivot about pins 34 and extend through recesses 21 of socket 17. As a result, the pawls 35 extend into the path of projections 13 and cause the latter to rotate together with the casing 11, as shown in Fig. 2. Because of the contact between pawls 35 and projections 20 the friction socket 17 is also caused to rotate.

When it is desired to move into free wheeling, the driver shifts into neutral and stops pedalling which terminates rotation of wheel 23 and of all associated elements through pins 34 and pawls 35. Casing 11 and annular member 12 with its projections 13 continue to rotate and the frictional forces of springs 18 cause socket 17 to be carried along slightly by projections 13. Because of the spacing between edges 22 and projections 20 of the socket 17, just sufficient to accommodate the pawls when they extend through recesses 21, sliding of the socket 17 causes the edges 22 to return the pawls 35 to their nonprotruding position shown in Fig. 3. Because pawls 35 are disengaged from projections 13 the casing 11 can rotate freely while the elements within the casing are stationary.

Figure 3:
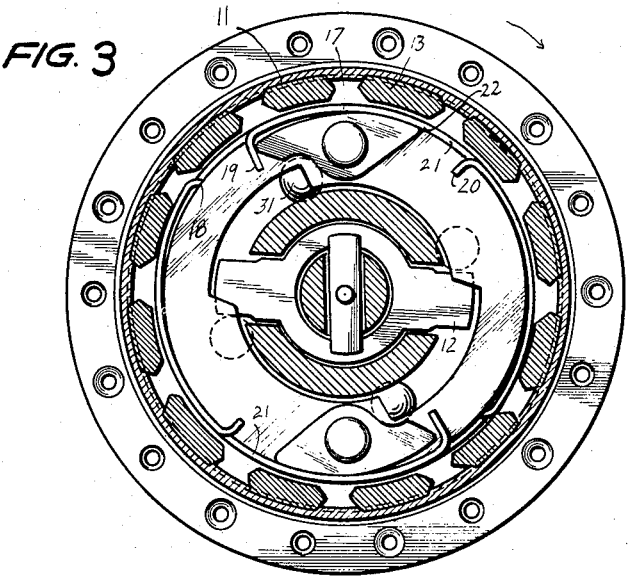
Fig. 3 is a view similar to Fig. 2 but with the elements shown in the position they assume during free wheeling or braking.

When braking, the pins 34 revolve in counterclockwise direction so that the pawls 35 assume the same relative position shown in Fig. 3, as during free wheeling.

It is noted that the ability to eliminate the return springs for the pawls is due to the dimensioning of the recesses 21 so that they will just accommodate the pawls 35 when the latter are extended. If these recesses are considerably larger, the automatic return will not be realized and special return measures such as the springs will be essential.

The instant application is a continuation-in-part of application Serial No. 611,310 filed September 21, 1956.

Various changes and modifications may be made without departing from the spirit and scope of the present invention and it is intended that such obvious changes and modifications be considered within the purview of the annexed claims.

What is claimed is:

1. In a bicycle hub including a rotatable casing and drive means, gear means within said casing and operatively connected with said drive means, a friction socket disposed within said socket and slidingly engaging said casing, said friction socket being provided with at least one recess, and at least one pawl pivotally connected with said gear means within said casing, said pawl during normal driving extending through said recess of said friction socket to engage said casing for driving the latter, the length of said recess being such that it just accommodates the pawl when the latter is in pivoted position extending therethrough, whereby upon termination of rotation of said drive means, continued rotation of said casing will cause said socket to be frictionally carried along, one of said recess edges serving to return the pawl to non-extending position when rotation of the drive means is terminated and the other edge limiting the pivoting movement of the pawl to maintain engagement with the casing during normal driving.

2. A bicycle hub comprising a rotatable casing provided with an annular inner surface having cam projections, driving means including an impeller extending into said casing, a friction socket provided with a plurality of recesses, inwardly directed projections and outwardly arched leaf springs, said socket slidingly engaging the interior of said casing with said leaf springs frictionally resting on an annular surface of said casing, a gear within said casing and rotated by said impeller, a plurality of pins operatively connected with said gear and rotated thereby, and a plurality of pawls each pivotally mounted on a respective pin and extending through a respective recess of said socket to engage a cam projection of said casing, each recess being defined by a pair of opposed edges spaced apart just sufficient to accommodate the pawl which extends therethrough, one of the edges serving to limit the pivoting of said pawl and thereby maintain it in contact with the cam projection for driving of the hub casing, the other edge upon termination of actuation of said impeller being rotated by the casing due to the latter's frictional contact with the socket, rotation of said other edge causing said pawl to pivot and return to its non-projecting position so that said casing can continue to rotate without positive connection with said pawl.

References Cited in the file of this patent

UNITED STATES PATENTS 2,799,183    Rhein et al. _____ July 16, 1957

UNITED STATES PATENT OFFICE
CERTIFICATE OF CORRECTION

Patent No. 2,844,050                        July 22, 1958

Ludwig Brendel

It is hereby certified that error appears in the above numbered patent requiring correction and that the said Letters Patent should read as corrected below.

In the heading to the printed specification, line 7, for the priority date, "February 26, 1956" read -- February 25, 1956 --.

Signed and sealed this 23rd day of September 1958.

(SEAL)
Attest:

KARL H. AXLINE

Attesting Officer

ROBERT C. WATSON
Commissioner of Patents